United States Patent [19]
Pettersson et al.

[11] Patent Number: 5,850,916
[45] Date of Patent: Dec. 22, 1998

[54] TOOL PACKAGE

[75] Inventors: Barbro Pettersson, Sandviken; Ingemar Berger; Karl-Magnus Andersson, both of Bollnäs; Tord Englund, Alfa; Bo Wåhlen, Edsbyn, all of Sweden

[73] Assignee: Sandvik AB, Sandviken, Sweden

[21] Appl. No.: 894,685

[22] PCT Filed: Feb. 29, 1996

[86] PCT No.: PCT/SE96/00263

§ 371 Date: Dec. 22, 1997

§ 102(e) Date: Dec. 22, 1997

[87] PCT Pub. No.: WO96/26810

PCT Pub. Date: Sep. 6, 1996

[30] Foreign Application Priority Data

Mar. 1, 1995 [SE] Sweden ................................. 9500744

[51] Int. Cl.$^6$ ................................................. A45C 11/26
[52] U.S. Cl. ........................... 206/349; 206/468; 206/485
[58] Field of Search ............................ 206/6.1, 349, 379, 206/468, 485

[56] References Cited

U.S. PATENT DOCUMENTS

| | | | |
|---|---|---|---|
| 4,069,915 | 1/1978 | Schurman | 206/349 |
| 5,044,591 | 9/1991 | Huang . | |
| 5,148,914 | 9/1992 | Budert et al. . | |
| 5,413,223 | 5/1995 | Kang | 206/349 |
| 5,501,330 | 3/1996 | Betts | 206/349 |

FOREIGN PATENT DOCUMENTS

| | | |
|---|---|---|
| 463 607 | 12/1990 | Sweden . |
| 632 969 | 11/1980 | Switzerland . |
| 2 112 731 | 7/1983 | United Kingdom . |
| WO 90/11948 | 10/1990 | WIPO . |
| WO 94/24008 | 10/1994 | WIPO . |

*Primary Examiner*—David T. Fidei
*Attorney, Agent, or Firm*—Burns, Doane Swecker & Mathis LLP

[57] ABSTRACT

Package for an elongated tool, comprising a frame with two longitudinal sides (12), a first cross-bar (13) with centering support (15) for a first end of the tool, a second cross-bar (14) with a hole (17) through which the second end of the tool can be pushed, two extensions (18) of the sides at the second cross-bar, and a separate retainer (19) which can be moved along the extensions towards the second cross-bar (14) when the tool has been placed in the package a first time, and moved in both directions after a seal cross-piece (24) of the retainer (19) has been broken or removed.

6 Claims, 1 Drawing Sheet

TOOL PACKAGE

BACKGROUND OF THE INVENTION

It is previously known to make packages for tools in the shape of more or less open frames protecting sharp cutting edges from damaging or being damaged by other objects, as described in patents U.S. Pat. No. 5,044,591 and GR 1 553 549. The package can also be made with a tamper-proof seal when they are first applied around the tool, requiring some clearly visible alteration to the package to remove it from the tool, possibly requiring the use some other tool, such as described in patents U.S. Pat. No. 5,148,914 and GB 2 112 731. This shows the buyer that the tool is unused and will also discourage pilfering at self-service stores.

The patent SE 8700631-8 shows a package where an indicating seal must be torn away the first time the package is opened. This package has the disadvantage of not being adaptable to tool with different lengths, and tearing of the seal may damage other part of the package, making it unsuitable for further use.

OBJECTS OF THE INVENTION

The present invention is a package which is easily adaptable to tools of different length, and which requires some tool for tearing of the seal, and where tearing of the seal will not reduce the possibility of further use.

DETAILED DESCRIPTION OF THE PREFERRED EMBODIMENTS

Figure 1:
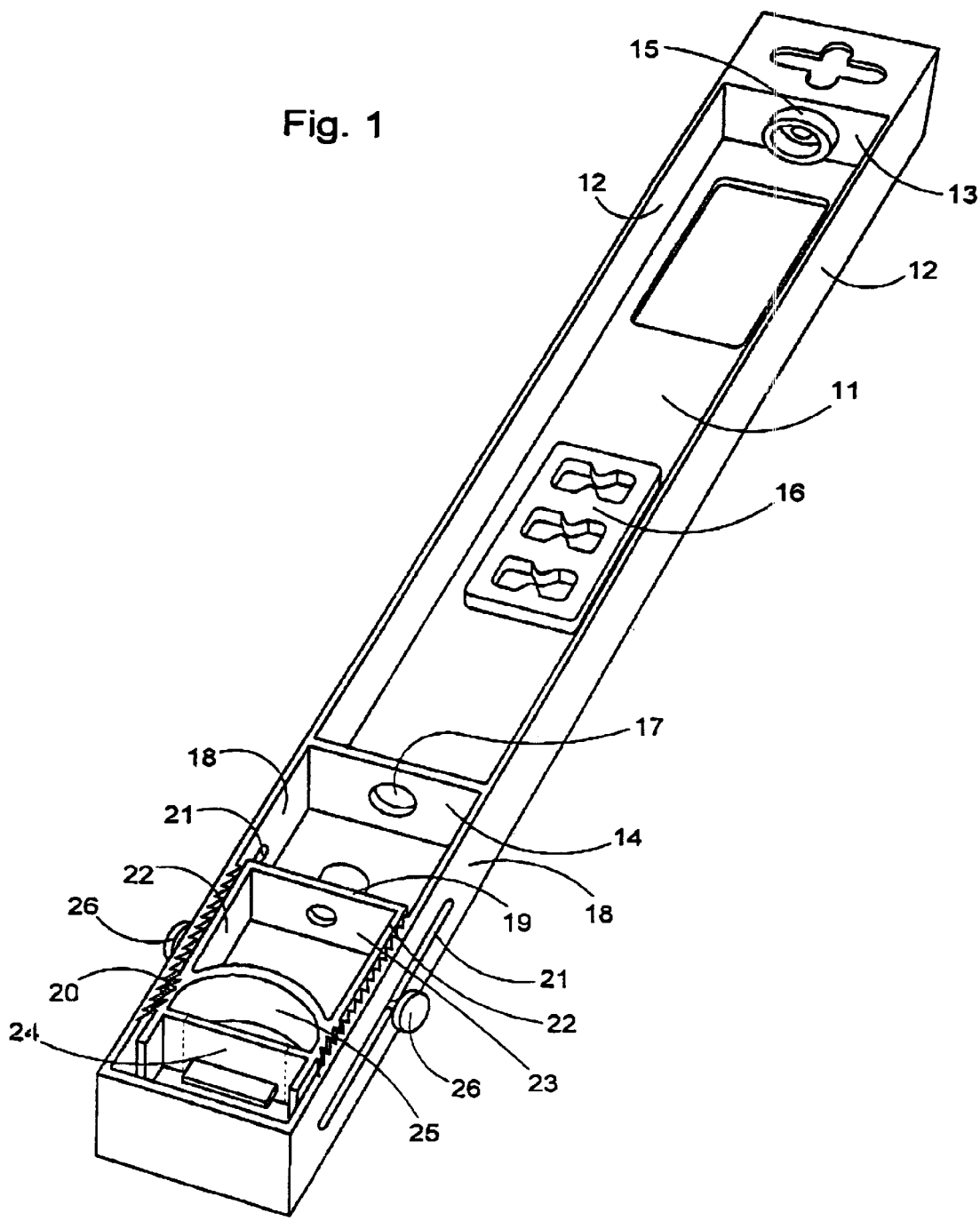
FIG. 1 is a perspective view of a tool package according to the present invention.

A tool package according to the invention comprises an elongated frame-type part, an upper cross-bar of which has a centering support and a lower cross-bar of which, has an hole and outside of that hole a slideable retainer. As long as a seal on the retainer is intact, the retainer can only be moved towards the hole, locking the elongated tool between the retainer and the centering support. When the seal has been torn or removed, the retainer can be moved in both directions, to allow the tool to be freed or replaced.

One embodiment of the invention is shown in FIG. 1, showing a package for an elongated tool such as a drill or drill extension shaft. The package comprises a frame with two longitudinal sides (12), one upper cross-bar (13) and one lower cross-bar (14). The frame may have a flat bottom (11) which may have one or more cutouts to make the tool visible from more directions or to simplify mounting or removal. The upper cross-bar is made with a centering support (15) which will support the tool not allowing it to be lifted out of the frame or moved to one side. For drills and similar rotatable tools this means that the support (15) at the upper cross-bar (13) can be made with a projecting collar encircling the end of the tool, or a projecting point which can enter a recess in the tool, or a narrow hole where part of the tool point but not the whole tool can penetrate, or a combination of those. The upper cross-bar (13) or the support (15) can be made with a limited resilience to hold the tool more safely.

The bottom (11) of the frame can be plain or provided with holders (16) for accessories such as hexagon kelps for setting of adjustable drills. The holder can be resilient or located where the tool will keep the accessory from falling out.

The lower cross-bar (14) of the frame is made with a hole (17) large enough that the tool end can easily be pushed through. Below the lower cross-bar the package comprises extensions (18) of the longitudinal sides (12), at least partly made as toothed racks, and a retainer (19) with hooks (20) which can engage the racks. The extensions (18) have longitudinal slots (21) adjacent the racks.

The retainer (19) is separate from the frame and the extensions (18). It has two parallel legs (22) with hooks (20) which can engage the teeth of the racks. Hooks and teeth are unsymmetrical to allow sliding the retainer upwards only, but not downwards, when they are engaged. The upper parts of the legs (22) are connected by a retaining cross-piece (23) shaped as a support for the lower end of the tool. The lower parts of the legs (22) are connected by a seal cross-piece (24) shaped to be easily broken or removed with pliers or other tools, but not without. This is achieved by making it as a tab which is so small or located so close to other parts of the retainer that it can not be pulled with fingers alone, and which will break easily once it is pulled due to thinned breaking zones, shown as dashed lines in the figure. As long as the seal cross-piece (24) is intact, the legs are kept at such a distance that the hooks (20) are held against the racks. The legs are also connected by a soft spring (25) which will press the hooks against the racks even after breaking of the seal cross-piece. The spring force is limited and pressure on guide buttons (26) penetrating the slots (21) will overcome the spring force and move the legs and the hooks (20) away from the racks, which then allows moving the retainer freely in both directions along the extensions (18).

When a package is ready for mounting of a tool, the retainer (19) is at its lowest position. The lower end of the tool is pushed through the hole (17) in the lower cross-bar (14) so far that the upper end of the tool can be located on the centering support (15) of the upper cross-bar (13). The retainer (19) is then pushed upwards until the retaining cross-piece (23) is pressed against the lower end of the tool to hold it in place. The first time this occurs, the seal cross-piece (24) is intact and the hooks (20) prevent the retainer from sliding back.

To remove the tool from the package, the seal cross-piece (24) must be broken or removed, the guide buttons (26) pressed together to disengage the hooks, and the retainer (19) slid so far down that the tool is loosened from the centering support (15). If a package is to be re-used, the retainer can afterwards be easily moved up or down when the guide buttons (26) are pressed.

At or above the upper cross-bar (13) the package may be arranged with holes for hanging on wall pegs. At or between the extensions (18) is a suitable place for product information.

According to the invention, variations can be made of the described embodiment by locating the peg holes at the same end as the retainer (19), or at a longitudinal side (12) or at several places. In such cases, the terms upper and lower should be interpreted as referring to the figure, not to how the package is hung on a wall.

The invention may also be used for packages for more than one tool, if the centering support (15), the hole (17) and the retaining cross-piece (23) are multiplied or shaped to hold several tools. The centering support (15) and the hole (17) may be symmetric to allow different orientations of the tool, or unsymmetric to allow only one defined orientation. The accessory holder (16) can be made to hold several accessories such as keys, points or cutter bits or none at all. The package can also be provided with lugs and recesses to assist stacking of several packages.

We claim:

1. A package for a tool, comprising an elongated frame with two longitudinal sides, a first cross-bar with a support for one end of the tool, a second cross-bar with a hole through which a second end of the tool can be pushed, two extensions from the longitudinal sides adjacent the second cross-bar, and a separate retainer slidable along the extensions, the retainer being movable only towards the second cross-bar locking the tool between the retainer and the first cross-bar when the tool is placed a first time in the package, and the retainer being movable both toward and away from the second cross-bar after a seal cross-piece being part of the retainer has been broken or removed wherein the tool can be unlocked by moving the retainer away from the second cross-bar.

2. The package according to claim 1, wherein the retainer is provided with hooks and the extensions are made as racks which can engage the hooks to prevent the retainer from moving away from the second cross-bar.

3. The package according to claim 2, wherein the retainer has two lateral guide buttons which can be pressed together if the seal cross-piece has been broken or removed, and which will then disengage the hooks from the racks to allow the retainer to move away from the second cross-bar.

4. The package according to claim 1, wherein the seal cross-piece is located so close to other parts of the retainer that it can not be broken or removed with fingers only.

5. The package according to claim 1, wherein the support is made to center and hold the first end of the tool against the first cross-bar by means of holes smaller than the tool end, or raised collars or both.

6. The package according to claim 1, wherein the first cross-bar is elastically resilient.

* * * * *